Patented Feb. 6, 1945

2,369,108

UNITED STATES PATENT OFFICE 2,369,108

SELECTIVE OXIDATION OF UNSATURATED FATTY BODIES

Latimer D. Myers and Cornelius Austin Sprang, Cincinnati, Ohio, assignors to Emery Industries, Inc., Cincinnati, Ohio, a corporation of Ohio No Drawing. Application July 28, 1942, Serial No. 452,626

7 Claims. (Cl. 260—406)

This invention relates to the oxidation of unsaturated components of a fatty body, that is, a fatty glyceride or fatty acid. The invention is directed particularly to a selective oxidation process wherein the di- and triolefinic acid components are oxidized into monobasic and dibasic compounds, while the singly unsaturated components are left in a substantially unmolested condition.

The process is useful for the selective oxidation of oils of the semi-drying type, including soybean oil, cottonseed oil, corn oil, pumpkin seed oil, mustard seed oil and like materials having an iodine value in the range from approximately 90 to approximately 140, and one of the chief uses of the invention is as a means of obtaining oleic acid or oils of similar characteristics from these vegetable oil sources, as well as of obtaining monobasic and dibasic compounds which are useful in and of themselves. Heretofore oleic acid has been produced only from animal fats; partial hydrogenation of vegetable oils for the purpose has been suggested upon the theory that the more highly unsaturated acids are capable of being hydrogenated into oleic acid before the oleic acid is hydrogenated to stearic acid. In actual practice, however, such selectivity is far from perfect and considerable quantities of solid iso oleic acids are formed. The iso oleic acids are not suitable for many purposes for which oleic acid is used and, as a result, the method has not been employed in a commercial way. At present animal fats are the only sources from which oleic acid is produced on a commercial basis.

Briefly, in accordance with the present invention, fatty oils and fatty acids of the type described are treated with an oxidizing agent, preferably one of the kind shown in the Fitzpatrick-Myers United States patent application Serial No. 385,740, composed of chromic acid and concentrated sulphuric acid. In accordance with the disclosure of that application, all of the unsaturated compounds of the fatty body, e. g. oleic acid, as well as linoleic and linolenic acid, are oxidized, and the products resulting from the oxidation are monobasic acids such as pelargonic, dibasic acids such as azelaic, and saturated byproduct acids of higher molecular weight.

Chromic acid, in admixture with sulphuric acid, is a strong and powerful oxidizing agent, in fact, it is used commonly as a cleaning compound in laboratories and elsewhere because of its recognized ability, and tendency, to oxidize a fatty body into carbon dioxide and water.

Fitzpatrick and Myers have shown in application Serial No. 385,740 filed March 28, 1941, that an oxidizing compound made up of these components may, under control, be applied to unsaturated fatty substances to give high yields of mono and dibasic acids, and to produce a distinctly useful result instead of the destruction expected of it.

Still more unexpectedly, we have found that the activity of a powerful oxidizing agent of this type can, in fact, be focused upon the di- and triolefinic acid components in a fatty body of the type described, to the substantial exclusion of attack of the mono olefinic acids. In this reaction therefore the oleic acid which is present is not oxidized. Linoleic and linolenic, on the other hand, containing two and three double bond compounds which endow such oils with their semi-drying properties, are converted into monobasic acids and dibasic acids or glycerides and the latter are separable from the oxidized mixture in such manner that the residual oil has the characteristics of and is essentially oleic acid.

Inasmuch as there is, at present, an appreciable shortage of oleic acid, the present process may be practiced as a means of obtaining an oil or fatty acid with characteristics of oleic acid from the vast source of vegetable oils which hithertofore has been substantially untouched for this purpose. But with the growing resin industry calling for greater supplies of dibasic acids, the process also may be utilized toward this end, in which event oleic acid might be considered the byproduct.

To obtain these results several controls are exercised upon the oxidizing agent. These are primarily the control of the amount of the oxidizing agent, and the control of the rate of oxidation. It is requisite, for selectivity to be obtained, that the amount of chromic acid employed be limited and controlled to provide four atoms of oxygen for the first double bond to be attacked, and eight atoms for each subsequent double bond with no substantial excess, though a slight excess for example 10%, based on the amount of oleic acid present, improves the yield without impairing selectivity. The quantitative amount of chromic acid required is readily ascertainable inasmuch as the percentage of linoleic and linolenic compounds in the semi-drying oil or fatty acid to be treated is known or readily may be determined. Sufficient chromic acid, therefore, is utilized to supply the requirements of oxygen for oxidation of the di- and triolefinic acids but none or any major portion of the singly unsaturated compounds.

While the amount of oxidizing agent required for the selective oxidation of a given fatty body will vary in accordance with the individual characteristics of that body and particularly will vary in accordance with its content of unsaturated compounds, the control of the concentration and the speed of reaction is essentially the same for all oils or fatty bodies containing acids more highly unsaturated than oleic. If the oxidizing agent is too strong then discrimination and selectivity are lost and mono, di and triolefinic acid compounds are attacked at random by the oxidizing agent and this results in a partial oxidation of the whole of the unsaturated acids as distinguished from the whole oxidation of selected components. To avoid this result therefore the two controls employed are the control of the amount of oxidizing agent and the control of the rate of reaction. The rate of reaction is governed mainly by the dilution of the oxidizing solution and particularly the chromic acid concentration, by operating at a carefully controlled lower temperature than that which ordinarily would be used for the oxidation of a singly unsaturated acid such as oleic, or by controlling the rate and method of addition of even a concentrated oxidizing mixture, that is, by adding such a mixture slowly with vigorous stirring to permit localized concentrations and reactions. Of these various methods the first is the one preferred for controlling the rate of reaction because it is more certain and somewhat less difficult to follow.

In the Fitzpatrick-Myers application which heretofore has been referred to the preferred oxidizing agent consists of one part of chromic acid anhydride, two and one-half parts of concentrated sulphuric acid and four parts of water. Such admixture contains from 13 to 14% of chromic acid and, if such a mixture is applied to an unsaturated fatty acid or fatty glyceride, without control, all of the double bonds are attacked without selectivity. In the practice of the present invention best selectivity is obtained when the solution is from approximately one-half to one-fourth this strong, that is, when the solution contains from approximately three to approximately seven percent of chromic acid.

Thus, a solution containing from approximately six to seven percent of chromic acid reacts with a body of the type described at room temperature and the temperature will rise to approximately 80° C. through the heat of reaction. After approximately three hours the temperature is heated to the neighborhood of 90 to 100° C. for one hour after which the selective oxidation is complete. If the solution is approximately one-half as concentrated, that is, contains from three to four percent of chromic acid, it is necessary to heat the mixture of the reagent and the body being treated for a period of from three to four hours to obtain a complete reaction. In general, selectivity and promptness of reaction are obtained when the solution, as above described, is half diluted, that is, contains from six to seven percent chromic acid, and for these reasons a reagent of this concentration is preferred. A solution of the desired strength may be attained in various ways, such as decreasing the amount of chromic acid, either by diluting with water, or by electrolytically regenerating the spent liquor described in the Fitzpatrick-Myers application to only approximately 50% of its original strength.

Such a solution is used in an amount sufficient to provide oxygen for oxidation of the di- and triolefinic components of the oil being treated. For each percentage of linoleic acid present in mixed fatty acids of the type described approximately 2.86% of chromic acid based on the weight of the total fatty acids will supply the oxygen required. For each percentage of linolenic acid present 4.80% of chromic acid will supply the necessary oxygen. When certain and complete removal of the linoleic and linolenic acids is desired it is helpful to employ sufficient oxidizing agent to oxidize a small portion of the oleic acid also, usually not more than 10% thereof. Each percentage of oleic acid to be oxidized for this purpose requires .94% of chromic acid and, as a general rule, the oxidation of 10% of the oleic acid which is present will insure complete oxidation of the more highly unsaturated acids. While this data is given in terms of fatty acids as distinguished from their glycerides suitable values for glycerides can be obtained by employing 95% of the above quantities to compensate for the increased weight due to the glycerine residue.

The following data is illustrative of the mono, di, and triolefinic acid compounds in representative oils of the type to which the present invention is applicable.

In linoleic acid the double bonds are located between the 9th and 10th carbon atoms and between the 12th and 13th carbon atoms; in linolenic acid there is an additional double bond between the 15th and 16th carbon atoms. The split at the 9–10 carbon positions results in the production of one mol of azelaic acid; if no other double bonds are present the second product is one mol of pelargonic acid, as follows:

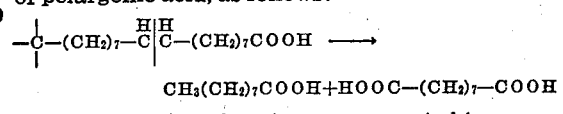

$$CH_3(CH_2)_7COOH + HOOC-(CH_2)_7-COOH$$

Pelargonic      Azelaic

If an additional double bond is present the reaction may be illustrated thus:

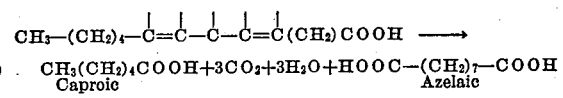

$$CH_3(CH_2)_4COOH + 3CO_2 + 3H_2O + HOOC-(CH_2)_7-COOH$$

Caproic      Azelaic

In this case splitting occurs not only at the 9–10 position but also at the 12–13 position. The 10th, 11th and 12th carbon atoms with their attached hydrogens are oxidized to carbon dioxide and water and caproic acid is obtained. If still another double bond is present as in linolenic acid the chain is split at the 15th and 16th carbon atoms and propionic acid is obtained.

After the oxidizing treatment the mixed acids products may be separated in various ways. One suitable method is described in Fitzpatrick and Myers United States patent application Serial No. 433,516 according to which the low molecular weight acids are first removed by distillation and the dibasic acids are then removed by washing with water. The fatty acids which remain consist of the solid fatty acids present in the original fatty acids, saturated acids formed as a by product of the oxidation and oleic acids. These acids may be distilled if desired and then further separated from one another by any suitable method as, for example, by solvents as described in the Myers-Muckerheide United States patent application Serial No. 348,246, now issued as United States Patent No. 2,293,676. In this manner a solid acid fraction containing a high percentage of palmitic acid and a liquid acid fraction with characteristics similar to those of commercial oleic acid are obtained. If desired the solid saturated acids also may first be separated by suitable solvent separation methods and the liquid acids then subjected to further oxidation.

With these principles in mind the examples which follow will illustrate the application of the invention to various semi-drying oils and their fatty acids.

*Example 1*

100 parts of soya fatty acids were oxidized with a total of 156.6 parts of chromic acid dissolved in 1033 parts of water and 300 parts sulphuric acid. This oxidizing solution was employed in three equal portions at a temperature of from 80–90° C. The oxidation products were treated with strong sulphuric acid to remove chromium compounds and washed with water to remove most of the sulphuric acid. The last traces of acid were neutralized with alkali. The sulphuric acid treatment should be controlled carefully to prevent excessive sulfation of the double bonds present. The most satisfactory method is the use of the minimum strength of sulphuric acid which will free the organic matter of chromium and heat very quickly for the minimum period of time necessary to destroy the green color.

The low boiling acids chiefly caproic acid were removed by distilling up to 220° C. The residue was washed four times with boiling water to remove azelaic acid. The residue remaining was distilled and the solid and liquid acids then separated.

By the above treatments there was obtained 27 parts of liquid acids, with properties similar to those of oleic acid, of 34.8 parts originally present. Of the 13.2 parts of solid acids present in the original material 12.6% were recovered. These results indicate that the solid acids are unaffected by the oxidation treatment and only a very minor proportion of the oleic acid was attacked. The oil recovered had an iodine value of 78 and a free fatty acid content of 97% calculated as oleic acid indicating complete removal of more unsaturated acids.

The 52 parts of linoleic and linolenic acids present in the original soya fatty acids were decomposed and there was recovered 24.8 parts of azelaic acid and 11.1 parts of caproic acid. Some of the caproic acid and all of the propionic acid was lost by volatilization. In addition to the above materials there was obtained 11.1 parts of tarry still residue.

*Example 2*

100 parts of corn oil fatty acids were oxidized with a total of 5300 g. of partially regenerated liquor from a previous oxidation, said liquor containing 6.8% (120.1 g.) of chromic acid, the remainder of the original amount of chromic acid being present as chromic sulphate; the procedure of oxidation and separation was the same as described in Example 1.

After solvent separation of the distilled acids the liquid fraction contained a small quantity of dibasic acids which had not been completely removed by aqueous extraction. The oil was taken up in petroleum ether to give a 15% concentration and was then filtered to remove the precipitated azelaic acid. Thirty-six and three tenths grams (80.8% of theory) of liquid acid with an iodine value of 84 was obtained.

*Example 3*

100 parts of cottonseed oil fatty acids were oxidized with 121 g. of chromic acid as a 7.56% solution by the same procedure as used for Example 1.

After complete separation by the procedure as given in Example 2, a yield of 17.6 g. (49% of theory) of a liquid product of iodine value of 68.5 was obtained.

Having described our invention, we claim:

1. A method of selectively oxidizing the di- and triolefinic components which are present in admixture with mono olefinic and saturated components in a fatty body selected from the class consisting of the mixed acids and glycerides of semi-drying oils, which method comprises subjecting the fatty body to a reagent containing from approximately 6 to 7% chromic acid at a temperature from approximately 80 to 100° C., to effect oxidation of the di- and triolefinic components of said fatty body without substantially attacking the mono olefinic components thereof.

2. A method of selectively oxidizing the di- and triolefinic components which are present in admixture with mono olefinic and saturated components in a fatty body selected from the class consisting of the mixed acids and glycerides of semi-drying oils, which method comprises subjecting the fatty body to a reagent containing from approximately 3 to 7% chromic acid at a temperature from approximately 80 to 100° C., to effect oxidation of the di- and triolefinic components of said fatty body without substantially attacking the mono olefinic components thereof.

3. A method of selectively oxidizing the di- and triolefinic components of a fatty body selected from the group consisting of the mixed acids and glycerides of semi-drying oils, which fatty body contains di- and triolefinic components in admixture with saturated and mono olefinic components, the said method comprising subjecting the fatty body to a reagent containing from approximately 6 to 7% of chromic acid, at a temperature of from approximately 80 to 100° C. to disruptively oxidize the di- and triolefinic components of said fatty body through scission, at the double bonds, of the molecules thereof without substantial oxidation of the mono olefinic components, the quantity of chromic acid being limited to provide, per molecule, not substantially more than 4 atoms of oxygen for each first double bond in the di- and triolefinic components, and in addition 8 atoms of oxygen for each subsequent double bond in the di- and triolefinic components.

4. A method of selectively oxidizing di- and triolefinic acids of mixed soybean fatty acids which are present therein in admixture with mono olefinic acids and saturated acids, which method comprises subjecting mixed soybean fatty acids to an oxidizing reagent containing approximately 3 to 7% of chromic acid at a temperature of from approximately 80 to 100° C. to effect oxidation of the di- and triolefinic fatty acids without substantially attacking the mono olefinic acids.

5. A method of selectively oxidizing di- and triolefinic acids of mixed cottonseed fatty acids which are present therein in admixture with mono olefinic acids and saturated acids, which method comprises subjecting cottonseed fatty acids to an oxidizing reagent containing approximately 3 to 7% of chromic acid at a temperature of from approximately 80 to 100° C. to effect oxidation of the di- and triolefinic fatty acids without substantially attacking the mono olefinic acids.

6. A method of selectively oxidizing di- and triolefinic acids of mixed corn oil fatty acids which are present therein in admixture with mono olefinic acids and saturated acids, which method comprises subjecting mixed corn oil fatty acids to an oxidizing reagent containing approximately 3 to 7% of chromic acid at a temperature of from approximately 80 to 100° C. to effect oxidation of the di- and triolefinic fatty acids without substantially attacking the mono olefinic acids.

7. A method of obtaining low iodine value oleic acid from mixed fatty acids containing di- and triolefinic acids in admixture with oleic and saturated acids, which method comprises selectively oxidizing the di- and triolefinic acids of the mixture by subjecting the mixture to a reagent containing approximately 3 to 7% of chromic acid at a temperature of from approximately 80 to 100° C. to effect oxidation of the di- and triolefinic acids into saturated acids of lower molecular weight and dibasic acids through scission at the double bonds thereof, and without substantially attacking the oleic acid, separating the low molecular weight and dibasic acids, then recovering the oleic acid from any unoxidized saturated acids which remain.

LATIMER D. MYERS.
C. AUSTIN SPRANG.